US008932783B2

(12) United States Patent
Watts et al.

(10) Patent No.: US 8,932,783 B2
(45) Date of Patent: Jan. 13, 2015

(54) SOLID OXIDE FUEL CELL OR SOLID OXIDE FUEL CELL SUB-COMPONENT AND METHODS OF PREPARING SAME

(75) Inventors: Merrill Ruth Watts, Selby (AU); Sudath Dharma Kumara Amarasinghe, Berwick (AU); Jonathan Gerald Love, Selby (AU)

(73) Assignee: Ceramic Fuel Cells Limited, Victoria (AU)

( * ) Notice: Subject to any disclaimer, the term of this patent is extended or adjusted under 35 U.S.C. 154(b) by 888 days.

(21) Appl. No.: 13/123,309

(22) PCT Filed: Oct. 9, 2009

(86) PCT No.: PCT/AU2009/001335
§ 371 (c)(1),
(2), (4) Date: Apr. 22, 2011

(87) PCT Pub. No.: WO2010/040182
PCT Pub. Date: Apr. 15, 2010

(65) Prior Publication Data
US 2011/0195343 A1    Aug. 11, 2011

(30) Foreign Application Priority Data
Oct. 9, 2008   (AU) .............................. 2008905267

(51) Int. Cl.
*H01M 8/12*   (2006.01)
*H01M 8/10*   (2006.01)
(Continued)

(52) U.S. Cl.
CPC .......... *H01M 4/9033* (2013.01); *H01M 4/8889* (2013.01); *H01M 8/124* (2013.01); *H01M 8/1253* (2013.01); *H01M 4/8657* (2013.01);
(Continued)

(58) Field of Classification Search
None
See application file for complete search history.

(56) References Cited

U.S. PATENT DOCUMENTS

| | | | |
|---|---|---|---|
| 2005/0074650 A1 | 4/2005 | Sridhar et al. | |
| 2006/0166070 A1* | 7/2006 | Hickey et al. | 429/33 |
| 2010/0266925 A1 | 10/2010 | Hori | |

FOREIGN PATENT DOCUMENTS

| | | |
|---|---|---|
| JP | 2006-344543 | 12/2006 |
| WO | WO 02/21625 A2 | 3/2002 |

(Continued)

OTHER PUBLICATIONS

Extended European Search Report issued in European Patent Application No. 09818687.7 on Aug. 10, 2012.
International Search Report, dated Nov. 6, 2009 issued in PCT/AU2009/001335.

*Primary Examiner* — Ula C. Ruddock
*Assistant Examiner* — Matthew Van Oudenaren
(74) *Attorney, Agent, or Firm* — Birch, Stewart, Kolasch & Birch, LLP

(57) ABSTRACT

A solid oxide fuel cell (SOFC) or SOFC sub-component comprising a YSZ solid oxide electrolyte layer (10), a LSCF cathode layer (14) and a mixed phase layer (18) comprising at least zirconia and ceria between the electrolyte layer and the cathode layer, with the cathode layer in direct contact with the mixed phase layer, that is with no ceria, other than in the mixed phase layer, between the cathode layer and the electrolyte layer. One method of forming the SOFC or sub-component comprises applying a layer of ceria on the electrolyte layer (10), heating the electrolyte and ceria layers to form the mixed phase layer (18), and removing excess ceria from the surface of the mixed phase layer before applying the cathode layer (14).

14 Claims, 3 Drawing Sheets

(51) Int. Cl.
  *H01M 8/00* (2006.01)
  *H01M 4/90* (2006.01)
  *H01M 4/88* (2006.01)
  *H01M 4/86* (2006.01)
(52) U.S. Cl.
  CPC ..... *H01M 8/1213* (2013.01); *H01M 2004/8689* (2013.01); *H01M 2300/0094* (2013.01); *Y02E 60/521* (2013.01); *Y02E 60/525* (2013.01)
  USPC .......................................... 429/496; 429/535

(56) References Cited

FOREIGN PATENT DOCUMENTS

| WO | WO 03/075383 A2 | 9/2003 |
| WO | WO2008/023805 A1 | 2/2008 |
| WO | WO 2008/023806 A1 | 2/2008 |

\* cited by examiner

SOLID OXIDE FUEL CELL OR SOLID OXIDE FUEL CELL SUB-COMPONENT AND METHODS OF PREPARING SAME

FIELD OF THE INVENTION

The present invention relates to solid oxide fuel cells (SOFC) or SOFC sub-components comprising a layer of yttria stabilised zirconia (YSZ) solid oxide electrolyte material, and to methods of preparing same.

BACKGROUND

In an SOFC, a layer of cathode material is provided on a first side of a layer of solid oxide electrolyte material and a layer of anode material is provided on an opposite, second side of the solid oxide electrolyte material. YSZ is one form of solid oxide electrolyte used for this purpose. However, deleterious reactions can occur between the cathode material and the YSZ electrolyte material that result in the formation of electrically insulating phases between the two. These insulating phases can have an impact on the stability and power density of the SOFC. For example, with the use of high performance cathode materials comprising lanthanum and strontium, the insulating phases that can form comprise oxides of lanthanum and zirconium and/or strontium and zirconium, including $LaZrO_3$ and $SrZrO_3$.

The insulating phases can form during use of the SOFC, but the problem primarily arises during manufacture of the SOFC, especially under the high temperature conditions required to prepare anode-supported SOFCs as discussed below.

To alleviate the formation of the insulating phases, it has been proposed to provide a reaction barrier layer between the layer of cathode material and the layer of YSZ electrolyte material, to prevent or at least decrease formation of the insulating phases. The reaction barrier layer is applied during manufacture of the SOFC, before the application of the cathode material to the electrolyte material. The electrolyte material having the reaction barrier layer precursor materials on the first side of the electrolyte layer can be sintered together, optionally with the anode precursor materials on the second side, at a suitable temperature, for example in the range of from about 1200° C. to 1500° C. The layer of cathode material can then be applied on to the reaction barrier layer as formed and the components sintered again, usually at a lower temperature, to provide the SOFC.

A proposed suitable reaction barrier layer comprises doped ceria $CeO_2$ (doped with either yttria ($Y_2O_3$), samaria ($Sm_2O_3$) or gadolinia ($Gd_2O_3$)), because there are no deleterious reactions between the doped ceria and the cathode. However, ceria is difficult to sinter into a coherent tough film at the elevated temperatures used, because oxygen evolves from the lattice and ceria and the dopant ions diffuse into the YSZ electrolyte leaving behind voids in the ceria reaction barrier layer. These internal voids in the reaction barrier layer, which can be in the range of from about 5 to 10 microns thick, lead to poor cell performance. Accordingly, the reaction barrier layer causes the SOFC to be unreliable.

One way of minimising the problem of ceria migration is to apply the ceria after the anode and the YSZ electrolyte have been co-fired together at high temperatures (in the range of from about 1200° C. to 1500° C.). The applied doped ceria can then be sintered, on the layer of electrolyte material, at a lower temperature in an extra firing step. However, an extra firing step is undesirable, because of the associated higher cost of SOFC manufacture.

Accordingly, there exists a need for a reaction barrier layer that performs better than that described above, and for a method of providing the reaction barrier layer on to the YSZ electrolyte.

SUMMARY OF THE INVENTION

According to a first aspect of the invention there is provided a method of preparing a solid oxide fuel cell or solid oxide fuel cell sub-component comprising a YSZ solid oxide electrolyte layer and a cathode layer, the method comprising the steps of:

provide a YSZ solid oxide electrolyte material having a first side and a second side opposite the first side;

forming a mixed phase layer comprising a mixed phase of at least zirconia and ceria on the first side of the electrolyte material; and depositing a cathode material onto a surface of the mixed phase layer to form the cathode layer on the first side of the electrolyte material;

wherein the cathode material is in direct contact with the mixed phase layer.

Further according to the first aspect of the invention, there is provided a solid oxide fuel cell or solid oxide fuel cell sub-component comprising a YSZ solid oxide electrolyte layer and a cathode layer, wherein:

the electrolyte layer has a first side and second side opposite the first side;

a mixed phase layer comprising a mixed phase of at least zirconia and ceria is provided on the first side of the electrolyte layer; and the cathode layer is provided on the mixed phase layer in direct contact therewith.

By the phrase "a mixed phase of at least zirconia and ceria" is meant that the ceria (and any ceria dopant ions) is incorporated as a solid solution into the zirconia ($ZrO_2$) lattice structure. It is believed that the ceria is incorporated into the zirconia matrix at the surface of the first side of YSZ electrolyte material in the same way as the yttria ($Y_2O_3$) dopant is incorporated into the zirconia matrix, the latter intended to stabilise the zirconia matrix.

By "the cathode material is in direct contact with the mixed phase layer" or equivalents such as "the cathode layer is provided on the mixed phase layer in direct contact therewith" is meant that the cathode material and the mixed phase are in contact with no free ceria therebetween. That is, all of the ceria present between the electrolyte layer and the layer of cathode material is in the mixed phase.

The resultant reaction barrier layer therefore comprises only the mixed phase of zirconia and ceria (and any dopant ions), and not ceria alone. Accordingly, the previous problems presented by the inclusion of a ceria layer in the SOFC are alleviated because the SOFC or SOFC sub-component of the invention does not have a ceria layer in which voids can form. The mixed phase layer formed by the present invention is therefore able to effectively act as a barrier layer that prevents or at least alleviates the formation of insulating phases between the cathode and YSZ electrolyte, while not impacting deleteriously on the SOFC's performance.

In one embodiment, forming the mixed phase layer comprises applying a layer of ceria to the first side of the electrolyte material and heating the ceria on the electrolyte material.

The ceria can be applied by, for example, plasma spraying, cold spraying or sputtering ceria onto the YSZ electrolyte surface. In other embodiments, a sol-gel or salt solution of ceria or a thin solution of suspended nano-particles of ceria can be applied to the YSZ electrolyte surface by spraying, spin coating or dip-coating. The applied coating can be of the order of a micron or sub-micron thickness. Alternatively, the ceria can be applied as a tape, powder or slurry or paste, as described in greater detail hereinafter.

The aforementioned heating to form the mixed phase layer can be concurrent with or subsequent to the layer of ceria being applied to the first side of the electrolyte material. The diffusion or other incorporation of the ceria into the zirconia matrix (and possibly some of the yttria in the electrolyte and/or ceria dopant ions present) occurs from about 1150° C. Accordingly, the electrolyte can be heated to at least 1150° C., preferably to at least about 1200° C. in order to cause the mixed phase of at least the zirconia and ceria to form.

In preferred embodiments, the YSZ solid oxide electrolyte material is provided with a solid oxide fuel cell anode material on the second side of the electrolyte material. In this case it may be necessary to heat the structure to form the mixed phase layer to a temperature of at least about 1300° C., for example 1300° C. to about 1450° C., to sinter the anode material and bond the layers together. A suitable anode material is a nickel-zirconia cermet.

Preferably, the YSZ electrolyte layer is provided as a thin, flat sheet of the type used in a planar SOFC. However, other shapes of the solid oxide YSZ electrolyte material could be used in the invention, including for example tubular electrolyte layers. The electrolyte material is able to be shaped until it is fired and solidified and can be applied in the form of a slurry onto a layer of anode material, which acts as an anode support layer, for co-firing therewith before or after the method of the invention is performed. The two components (i.e. electrolyte and anode) are thereby joined, and the cathode material can be applied to the mixed phase layer resulting from the heating of the layer of ceria. For tubular fuel cells, the electrolyte material can be extruded onto or co-extruded with a tubular anode layer into the desired tubular configuration.

In some embodiments, the method of the invention is performed without the layer of anode material in place on the second side of the electrolyte layer. However, this is not desirable, because the manufacture of the fuel cell is more efficient if the YSZ solid oxide electrolyte material is provided in accordance with the invention on the anode layer, since the heating step to diffuse or otherwise incorporate the ceria into the surface of the electrolyte material on the first side is then also used to sinter and bond those layers (anode/electrolyte/mixed phase layer) of the cell to one another. In other words, the mixed phase layer can be formed by co-firing the half cell structure, thereby cutting manufacturing costs.

The mixed phase layer is required when the cathode material comprises elements that will otherwise react with the underlying YSZ electrolyte to form insulating layers. Cathode materials that include elements such as, for example, lanthanum, strontium and barium would benefit from the mixed phase layer when used on a YSZ electrolyte. Such cathode materials include those having the formula:

$$A'_{1-x}A''_xB'_{1-y}B''_yO_3$$

where
A' is La;
A" is selected from Ca, Sr, Ni and Ba;
B' and B" are each separately selected from Cr, Mn, Fe, Co and Ni;
x=is in the range of from about 0 to about 0.5; and
y=is in the range of from about 0 to about 1.

In a preferred embodiment, the cathode material comprises $La_{0.6}Sr_{0.4}Fe_{0.8}CO_{0.2}O_3$ (known as an LSCF cathode material).

The cathode material may be applied to the mixed phase layer in any manner well known in the art for applying cathode material to a layer of electrolyte material, and fired under conditions that will also be well known to those in the art.

Doped ceria (which is sometimes referred to herein simply as ceria, unless it is clear that the context requires otherwise) has the required ionic conductivity for use in the SOFC. A wide range of ceria materials can be usefully employed in the present invention, including ceria compounds having the formula:

$$M_{1-x}Ce_xO_2,$$

where M is any one of Y, Sm, Gd, Nd, Pr, La or Tb; and
x is in the range of from about 0.8 to 0.9.

In a preferred embodiment, the doped ceria is represented by the formula $Sm_{0.2}Ce_{0.8}O_2$.

Preferably, the ceria is applied to the entire surface of the electrolyte material that will have the cathode thereon, so the mixed phase layer will be disposed therebetween. In some embodiments, some areas of the electrolyte that will have the cathode thereon can be free from ceria, but this is not desirable because these areas free from ceria could degrade during use of the cell leading to poor SOFC stability. In some embodiments, the layer of cathode material may be applied to only a portion of the first side of the layer of electrolyte material. In other words, the cathode layer may be smaller than the available surface on the first side of the layer of electrolyte material. In such embodiments, the portion of the first side of the layer of electrolyte material that does not have the cathode material on it does not need to have the mixed phase layer formed on it.

The mixed phase layer prepared by a method according to the present invention can be distinguished from a ceria barrier layer prepared according to the prior proposal, because the mixed phase layer has mechanical properties and toughness similar to the underlying YSZ electrolyte material itself. In other words, the mechanical hardness of the mixed phase layer is at least substantially the same as (that is, within about 10% of) the hardness of the YSZ solid oxide electrolyte material, and the grain structure of the mixed phase layer is at least substantially the same as the underlying grain structure of the solid oxide electrolyte.

In one embodiment, the method of forming the mixed phase layer comprises co-firing a ceria layer with the electrolyte to form the mixed phase of ceria and zirconia, and mechanically removing excess ceria from the surface of the mixed phase layer. This has been found to be the most cost effective method of achieving a reliable mixed phase layer without excess ceria that would lead to the problems of the prior proposal.

Thus, according to a second aspect of the invention there is provided a method of preparing a solid oxide fuel cell sub-component comprising a layer of YSZ solid oxide electrolyte material having a first side and a second side opposite the first side, the method being performed prior to the application of a layer of cathode material on the first side of the layer of electrolyte material and comprising the steps of:
providing a layer of ceria on the first side of the layer of electrolyte material;
heating the electrolyte material having the ceria thereon to form a mixed phase layer comprising a mixed phase of at least zirconia and ceria on the first side of the layer of electrolyte material and excess ceria on the mixed phase layer; and
removing the excess ceria.

This method may further comprise, after removing the excess ceria, the step of depositing a layer of cathode material on the mixed phase layer. Since the excess ceria has been removed, the cathode material will be in direct contact with the mixed phase layer.

Further according to the second aspect of the invention, there is provided a solid oxide fuel cell sub-component comprising:
a YSZ solid oxide electrolyte layer having a first side for supporting a layer of cathode material and a second side opposite the first side; and
a mixed phase layer comprising a mixed phase of at least zirconia and ceria on the first side of the layer of electrolyte material;
wherein there is no other ceria on the first side of the layer of electrolyte material than in said mixed phase.

Optional and preferred features of the SOFC or SOFC sub-component or the method of preparing same, according to the first aspect of the invention, may also apply, mutatis mutandis, to the second aspect of the invention and the disclosure of those features should be construed accordingly.

The following description applies to both aspects of the invention, unless it is clear from the context that this is not the case.

The thickness of the mixed phase layer may be in the range of from about 1 to about 5 microns, preferably about 3 microns. The mixed phase layer may have varying amounts of zirconia and ceria, as well as yttria from the YSZ electrolyte material and possibly ceria dopant concentrations as described in more detail below, through its thickness.

As described above, when ceria is provided to the YSZ electrolyte material surface and the surface is heated, zirconia and ceria (and, to a lesser extent, yttria and/or dopant ions in the ceria) form a mixed phase in the adjacent portion of the first side of the layer of YSZ solid electrolyte material. If excess ceria, that is ceria that has not formed a mixed phase with zirconia, is removed to expose the mixed phase, it has been found that the mixed phase does not react with the subsequently-applied cathode material and provides an effective, thin mixed phase reaction barrier layer. The removal of excess ceria does not detrimentally affect the performance of the mixed phase layer at all, and instead provides for a more robust reaction barrier layer that is at least substantially free from voids and is well adhered to the underlying electrolyte material.

Also as described above, the ceria can be provided to the first side of the layer of electrolyte material in a variety of different ways. In preferred embodiments it is applied as a particulate solid such as a powder. The powder can be applied loose, but is preferably mixed with a binder and solvent to provide a slurry or paste. The advantage of using a binder is that powder handling is easier. Suitable binders include those used in screen printing spraying and/or tape casting, for example polymethylmethacrylate (PMMA). Suitable solvents for use in the slurry or paste include those used in screen printing, spraying and/or tape casting, for example aqueous solutions including water. Preferably the ceria powder is in the form of a water based slurry with a PMMA binder and includes various additives including a dispersant, a defoamer, a rheology modifier or thickener and/or a pH modifier. The slurry may also include a wetting agent.

When a slurry of ceria is prepared, preferably the powder loading in the slurry is in the range of from 5 vol % to 60 vol %, more preferably 20 vol % to 40 vol %. High volume percentages e.g. higher than 40 vol % can be used, but any excess ceria becomes difficult to remove from the resultant mixed phase layer after heating as the volume percentage in the slurry increases. At lower than 20 vol %, it becomes less practical to work with the slurry in tape casting, which is discussed in more detail below. Most preferably the powder loading in the slurry is in the range of 22 vol % to 25 vol %. The advantage of a powder loading in this range is that although the ceria still incorporates into the zirconia matrix on the first side of the layer of YSZ electrolyte material to form a mixed phase when the electrolyte material is heated, any residual excess ceria remains as a loose, poorly sintered coating on the mixed phase layer that is easier to remove. Another advantage of a low powder loading in the slurry is the cost saving associated with less powder usage.

Preferably, the powder has a particle size distribution in the range of from about 0.3 micron to about 2.3 micron (μm), optionally with up to about 10% of particles having a size below 0.3 μm and up to about 10% of particles having a size above 2.3 μm. The ceria applied as a powder can be treated to deliberately deactivate the powder sintering capability. A fine powder comprising ceria can be deactivated by coarsening (i.e. decreasing the surface area of the powder) to achieve a particle size distribution within the desired range. The coarsening can be performed by heating the powder up to about 1200° C. followed by milling the powder. Preferably, the powder is provided or coarsened to have a surface area in the range of from about 1 $m^2/g$ to 10 $m^2/g$. Above 10 $m^2/g$ the powder becomes undesirably difficult to remove. Generally, the higher the surface area of the powder, the more difficult the excess ceria is to remove following sintering. In a preferred embodiment, the surface area of the powder is about 3 $m^2/g$. With a surface area of about 3 $m^2/g$, the powder should begin to sinter at a temperature of about 1100° C. and will have shrinkage of about 10% to about 15% at about 1400° C.

Alternatively, a solid ribbon or tape of ceria can be pre-prepared and applied to the surface of the YSZ electrolyte. The tape can be pre-prepared by heating a powder comprising ceria (or a slurry or paste thereof, for example as described above) in a mould to cause the powder to sinter and solidify. Preferably, the ceria is packed into the mould with a packing density in the range of from about 20 vol % to about 40 vol % with respect to the total volume of the mould. A packing density within this range provides a porous tape of ceria, which allows excess ceria to be more readily removed from the surface following sintering as described above with respect to the slurry.

Preferably, the layer of electrolyte material having the layer of ceria thereon in the form of a slurry or tape is heated as described above to at least 1150° C. in order to form the mixed phase of at least the zirconia and ceria on the first side of the layer of electrolyte material. In embodiments in which the anode is present on the anode-side of the electrolyte, the electrolyte is heated as described above to a temperature in the range of from about 1300° C. to 1450° C. to effectively bond the half cell structure together in the required density. The required density would be appreciated by the skilled addressee. In some embodiments, the required density is greater than 97% for the electrolyte, preferably greater than 99%, and 20% to 50% for the anode.

The heating step to sinter the cell components is undertaken for any period of time suitable to also form the mixed phase layer on the first side of the layer of electrolyte material. In some embodiments, the heating is undertaken for at least one hour, although longer or shorter time periods could be accommodated in order to prepare the SOFC as would be appreciated by the skilled person based on the teachings of this specification. Heating may be performed in an oven, or by other suitable means.

Following heating, ceria that does not form a mixed phase layer with the zirconia at the first side of the layer electrolyte material is in excess and must be removed from the surface of the mixed phase layer before application of the cathode material. Any suitable means of removing the excess ceria can be employed. In a preferred embodiment, mechanical means is employed, e.g. scraping or abrading by, for example, sanding, scrubbing and/or scouring. Other methods include sonication and/or sand or grit blasting with polymer beads or solid $CO_2$ (dry ice) or water-blasting to loosen and remove the excess ceria. In some embodiments, the excess ceria can be collected for reuse.

BRIEF DESCRIPTION OF THE FIGURES

A preferred embodiment of the invention will now be described with reference to the following drawings, which are intended to be exemplary only, and in which.

DESCRIPTION OF PREFERRED
EMBODIMENTS OF THE INVENTION

Figure 1:
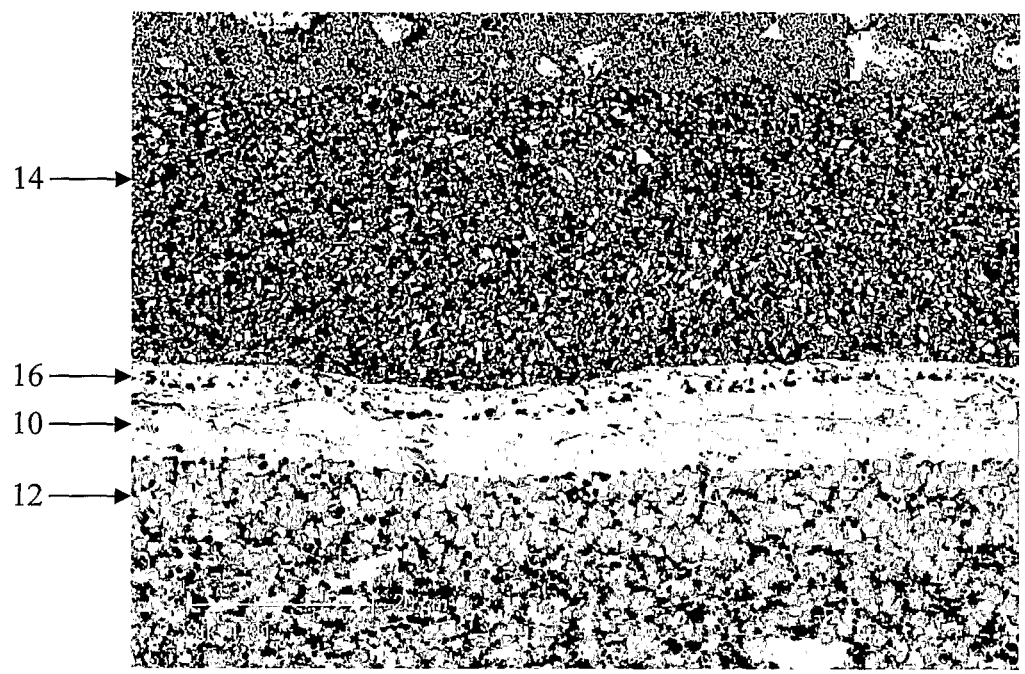
FIG. 1 is an SEM image of a portion of a solid oxide fuel cell according to a prior proposal.

FIG. 1 is an SEM image of a YSZ electrolyte 10 sandwiched between a Ni-YSZ cermet anode 12 and a LSCF cathode 14 according to a prior proposal (the "prior SOFC"). In order to prepare the prior SOFC of FIG. 1, a YSZ electrolyte having an anode on the anode-side was provided. The ceria was applied to the other side of the electrolyte by preparation of a slurry comprising powdered ceria, casting a tape of the slurry and laminating the tape to the anode/electrolyte assembly. The ceria used was doped as $Sm_{0.2}Ce_{0.8}O_2$. The anode/YSZ electrolyte assembly having the ceria layer on the electrolyte i.e. the half cell, was heated to about 1400° C. for a period of about one hour. The reaction barrier layer 16 comprising sintered ceria thus formed has an opaque appearance.

Following this treatment, an LSCF cathode material was deposited on the reaction barrier layer cathode-side of the electrolyte and sintered. The reaction barrier layer 16 of ceria, having a thickness of about 5 microns, can be clearly seen in the SEM image of FIG. 1 to have voids/pores therein. The ceria layer of the prior SOFC can have an adverse effect on the stability and power density of the cell as described above.

Figure 2:
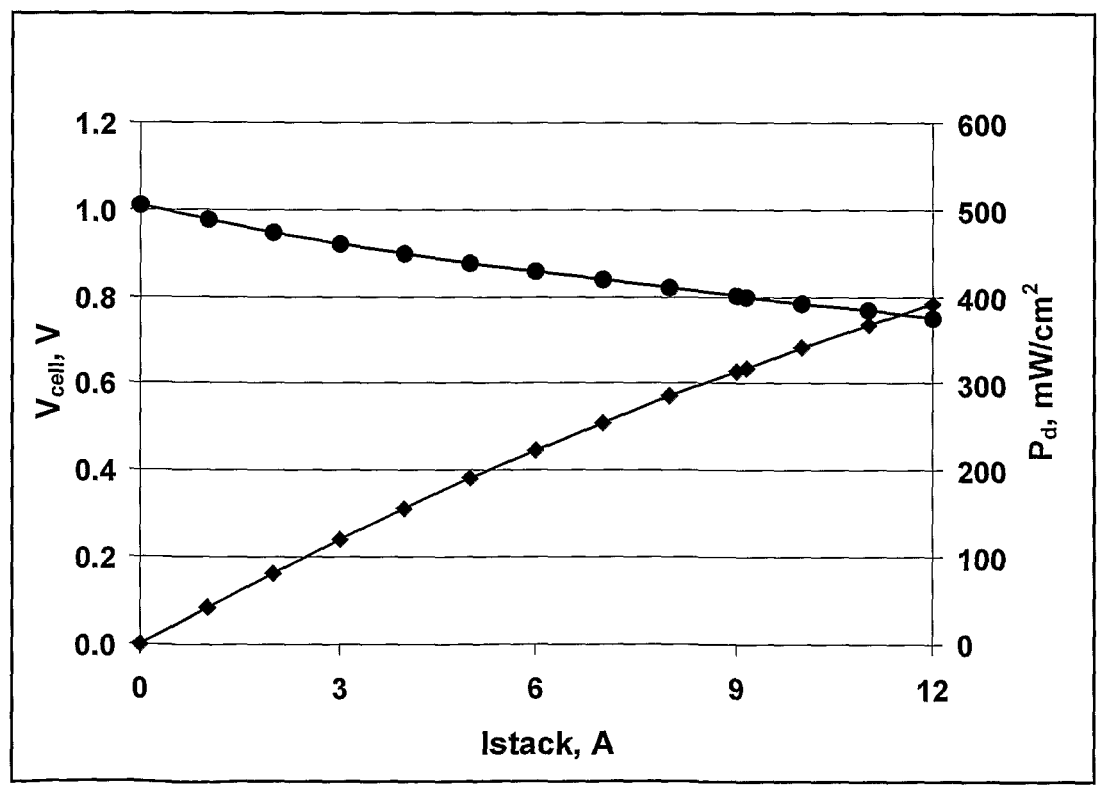
FIG. 2 shows a power density plot obtained from the solid oxide fuel cell of FIG. 1.

A typical power density plot of the prior SOFC is shown in FIG. 2. The cell was operated at 750° C. with fixed natural gas (NG) and air flow rates of 60 ml/min and 300 ml/min respectively, where the NG is 10% pre-reformed and desulphurised with steam additions giving a steam to carbon ratio of 2:1. The plot shows the voltage, that is the cell output, decreasing and power density increasing as the current is increased. The resultant power density is related to the cell resistance, which is high due to the poor structure of the ceria layer.

Figure 3:
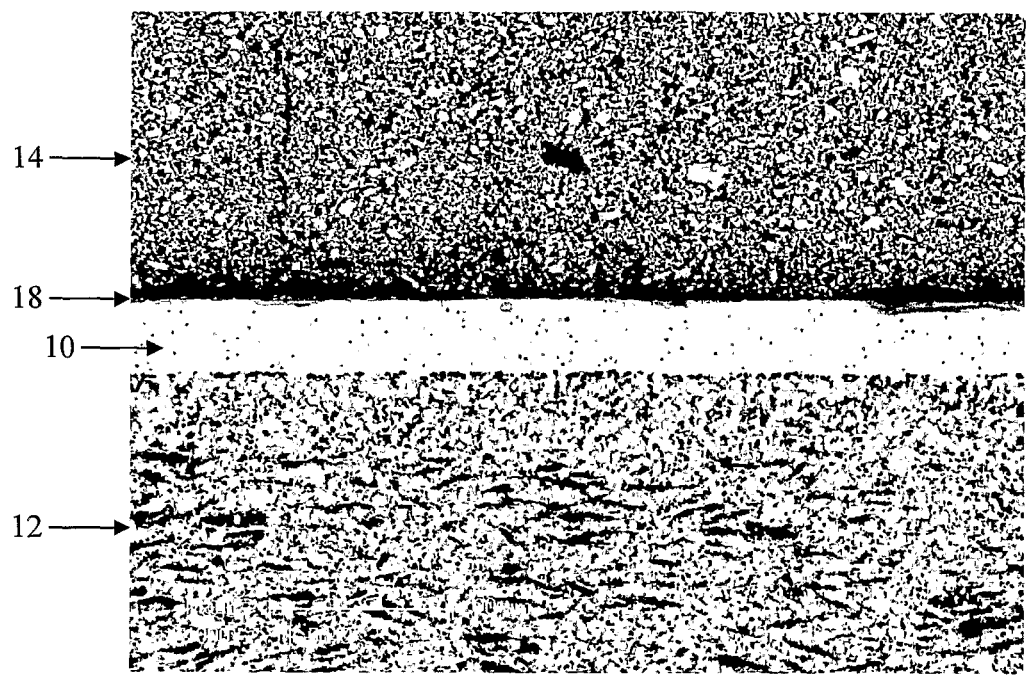
FIG. 3 is an SEM image of a portion of a solid oxide fuel cell according to one embodiment of the present invention.

FIG. 3 shows a YSZ electrolyte 10 sandwiched between a Ni-YSZ cermet anode 12 and a LSCF cathode 14 according to an embodiment of the present invention. Apart from the layer 16, this embodiment and its preparation is as described with reference to FIG. 1.

In this embodiment the ceria layer 16 has been entirely removed by mechanical abrading, leaving a mixed phase layer 18, comprising ceria and zirconia as well as Sm from the doped ceria and yttria from the zirconia at the surface of the electrolyte material, to which the layer 14 of cathode material is applied and sintered. The mixed phase layer 18 acts as the reaction barrier layer and has a translucent appearance similar to the YSZ electrolyte, with a thickness of about 3 μm. By "translucent" is meant that the underlying colour of the anode is clearly visible when looking, from the first side of the layer of YSZ electrolyte material, through the mixed phase layer 18 and electrolyte layer 10. This is different to the embodiment of FIG. 1 in which the ceria barrier layer 16 is opaque and masks the electrolyte layer as well as underlying colour of the anode, giving a resultant matt white, cream or pearl colour.

The SEM image of FIG. 3 reveals that mixed phase layer 18 has no voids and was adhered to the underlying electrolyte. The Zr:Ce mole ratio in the mixed phase layer 18 as a function of depth was measured by SIMS. The SIMS results are shown graphically in FIG. 5. It was found that the mole ratio of Zr:Ce in the mixed phase layer at the surface was about 0.21:1 as determined by extrapolating the plot in FIG. 5 to zero depth. The data at depths less than about 0.03 micron was heavily influenced by surface roughness. At a depth of about 0.1 microns the mole ratio of Zr:Ce in the mixed phase layer was about 0.38:1. Preferably, the mole ratio of Zr:Ce in the mixed phase layer is in the range of from about 0.3:1 to about 0.55:1 at a depth in the range of from 0.05 to about 0.2 microns. SIMS also revealed that the Zr:Ce mole ratio at a depth of about 0.8 microns was 2.46:1. Preferably, the mole ratio of Zr:Ce in the mixed phase layer at a depth of from about 0.7 μm to about 0.9 μm is in the range of from about 2:1 to about 3:1.

Figure 5:
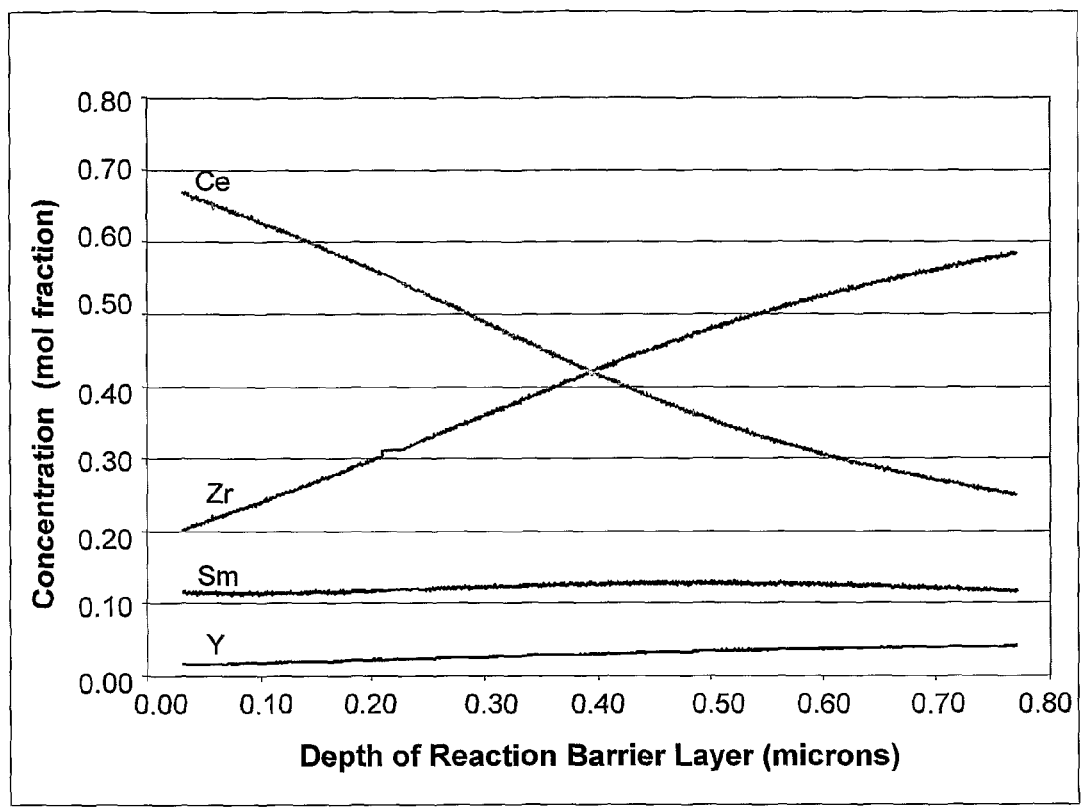
FIG. 5 shows the mole fraction concentration of Zr, Y, Ce and Sm as a function of depth in a mixed phase reaction barrier layer prepared according to one embodiment of the invention.

Surface analysis using SIMS also revealed that the mixed phase had a Zr content in the top layer of the surface (i.e. at zero micron depth). The amount of Zr determined by extrapolation of the region between 0.1 to 0.8 microns was about 0.18 mol fraction of Zr at the top surface. Preferably, the top surface comprises from 0 to about 0.26 mol fraction of Zr with the balance being Y, Ce and any ceria dopant, e.g. Sm. Surface analysis using SIMS also revealed that the Sm, if present, diffused into the YSZ electrolyte faster than Ce. This is shown in FIG. 5, where the Sm to Ce mol fraction ratio is about 0.55 in the mixed phase reaction barrier layer at a depth of 0.7 micron, rather than a ratio of 0.2 as used in the starting ceria material. When other dopants, such as Y or Gd, are used in the ceria the relative diffusion rates into YSZ with respect to ceria may result in different depth concentration of these dopants.

Figure 4:
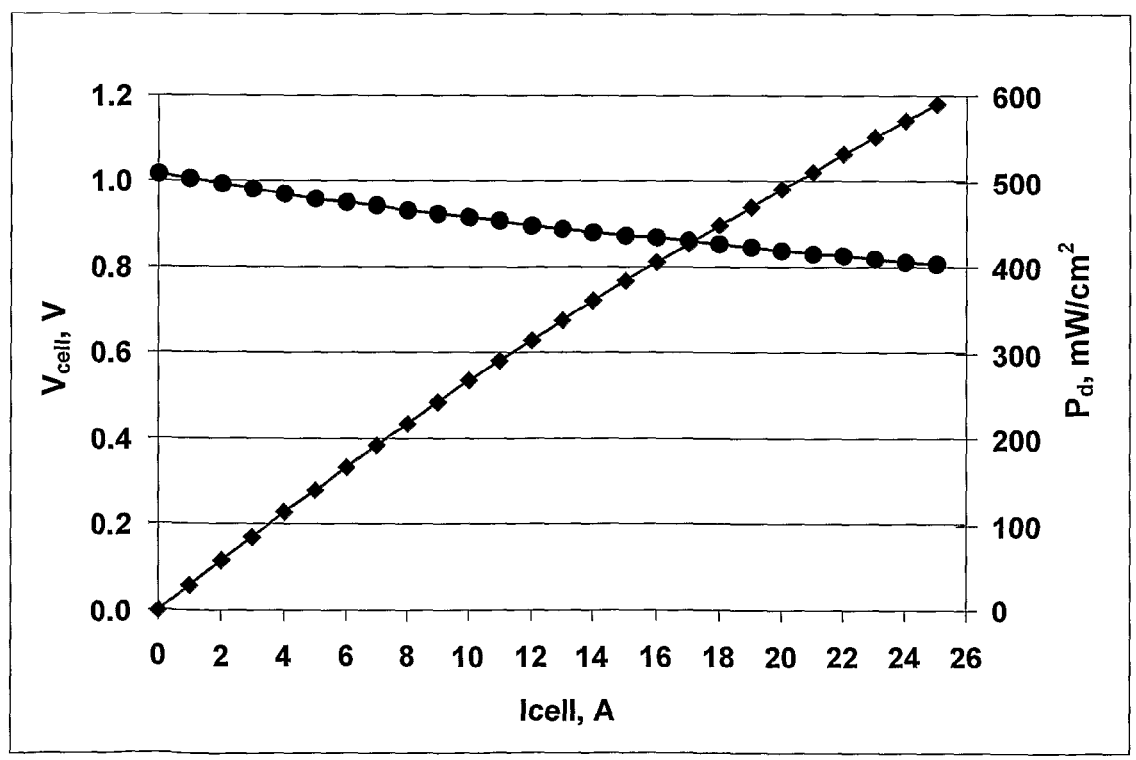
FIG. 4 shows a power density plot from the solid oxide fuel cell of FIG. 3.

A performance plot of the SOFC according to the embodiment of the invention described with reference to FIG. 3 is shown in FIG. 4. The cell was operated at 750° C. with fixed natural gas (NG) and air flow rates of 60 ml/min and 800 ml/min respectively, where the NG is 10% pre-reformed and desulphurised with steam additions giving a steam to carbon ratio of 2:1. The air flow was higher for the cell compared to the prior SOFC to maintain similar air and fuel utilisations at the higher power outputs of this cell according to the invention.

The power density at 0.8 V of the prior SOFC and the SOFC of the invention can be compared. At 0.8 V, the power density of the prior SOFC is about 300 mW/cm$^2$ (determined from the plot of FIG. 2). For the cell according to the present invention, at 0.8 V, the power density is nearly 600 mW/cm$^2$ (determined from the plot of FIG. 4) due to the lower cell resistance brought about by the cathode material being in direct contact with the mixed phase layer 18.

Those skilled in the art will appreciate that the invention described herein is susceptible to variations and modifications other than those specifically described. It is to be understood that the invention includes all such variations and modifications which fall within its spirit and scope.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method of preparing a solid oxide fuel cell sub-component comprising a layer of YSZ solid oxide electrolyte material having a first side suitable for
   receiving a cathode material thereon and a second side opposite the first side, the method comprising the steps of:
   providing a layer of ceria on the first side of the layer of electrolyte material;
   heating the electrolyte material having the ceria thereon at a temperature in the range of 1150° C. to 1450° C. to form a mixed phase layer comprising a mixed phase of at least zirconia and ceria on the first side of the layer of electrolyte material and excess ceria on the mixed phase layer; and
   removing the excess ceria.

2. A method according to claim 1, wherein the heating is performed concurrently with the layer of ceria being applied to the first side of the electrolyte material.

3. A method according to claim 1, wherein the heating is performed subsequent to the layer of ceria being applied to the first side of the electrolyte material.

4. A method according to claim 1, wherein the heating to form the mixed phase layer is to a temperature of at least about 1400° C.

5. A method according to claim 1, wherein the layer of electrolyte material has a layer of anode material on the second side thereof.

6. A method according to claim 5, wherein the heating to form the mixed phase layer is at a temperature in the range of about 1300° C. to 1450° C.

7. A method according to claim 1, wherein removing the excess ceria comprises mechanically scraping or abrading the surface of the mixed phase layer.

8. A method according to claim 1, wherein the method further comprises, after removing the excess ceria, the step of depositing a layer of cathode material onto the mixed phase layer to form a solid oxide fuel cell or solid oxide fuel cell sub-component in which the cathode material is in direct contact with the mixed phase layer.

9. A solid oxide fuel cell or solid oxide fuel cell sub-component comprising a YSZ solid oxide electrolyte layer and a cathode layer, wherein:
   the electrolyte layer has a first side and second side opposite the first side;
   a mixed phase layer comprising a mixed phase of at least zirconia and ceria formed by heating a layer of free ceria on the first side of the electrolyte is provided on the first side of the electrolyte layer; and
   the cathode layer is provided on and in direct contact with the mixed phase layer with no free ceria therebetween;
   and wherein the proportion of Zr in the mixed phase layer decreases through the thickness of the mixed phase layer from the electrolyte layer to a surface of the mixed phase layer remote from the electrolyte layer.

10. A solid oxide fuel cell or solid oxide fuel cell sub-component according to claim 9, wherein the thickness of the mixed phase layer is in the range of about 1 to about 5 μm.

11. A solid oxide fuel cell or solid oxide fuel cell sub-component according to claim 9, wherein a mole fraction of zirconium at a surface of the mixed phase layer remote from the electrolyte layer is in the range of from about 0 to about 0.26.

12. A solid oxide fuel cell or solid oxide fuel cell sub-component according to claim 9, wherein a mole ratio of Zr:Ce in the mixed phase layer is in the range of from about 0.3:1 to about 0.55:1 at a depth from a surface of the mixed phase layer remote from the electrolyte layer of from about 0.05 to about 0.2 μm.

13. A solid oxide fuel cell or solid oxide fuel cell sub-component according to claim 9, wherein a mole ratio of Zr:Ce in the mixed phase layer is in the range of from about 2:1 to about 3:1 at a depth from a surface of the mixed phase layer remote from the electrolyte layer of from about 0.7 to about 0.9 μm.

14. A solid oxide fuel cell or solid oxide fuel cell sub-component according to claim 9, wherein the ceria in the mixed phase layer is doped with one or more of Y, Sm, Gd, Nd, Pr, La and Tb.

* * * * *